Figure 12:
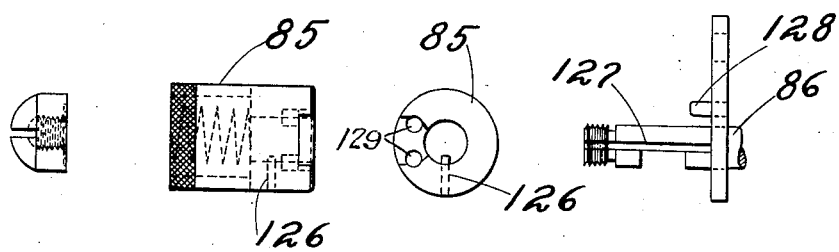

E. J. VON PEIN.
CASH AND AUTOGRAPHIC REGISTER.
APPLICATION FILED MAR. 9, 1910.
1,131,753.
Patented Mar. 16, 1915.
6 SHEETS—SHEET 1.
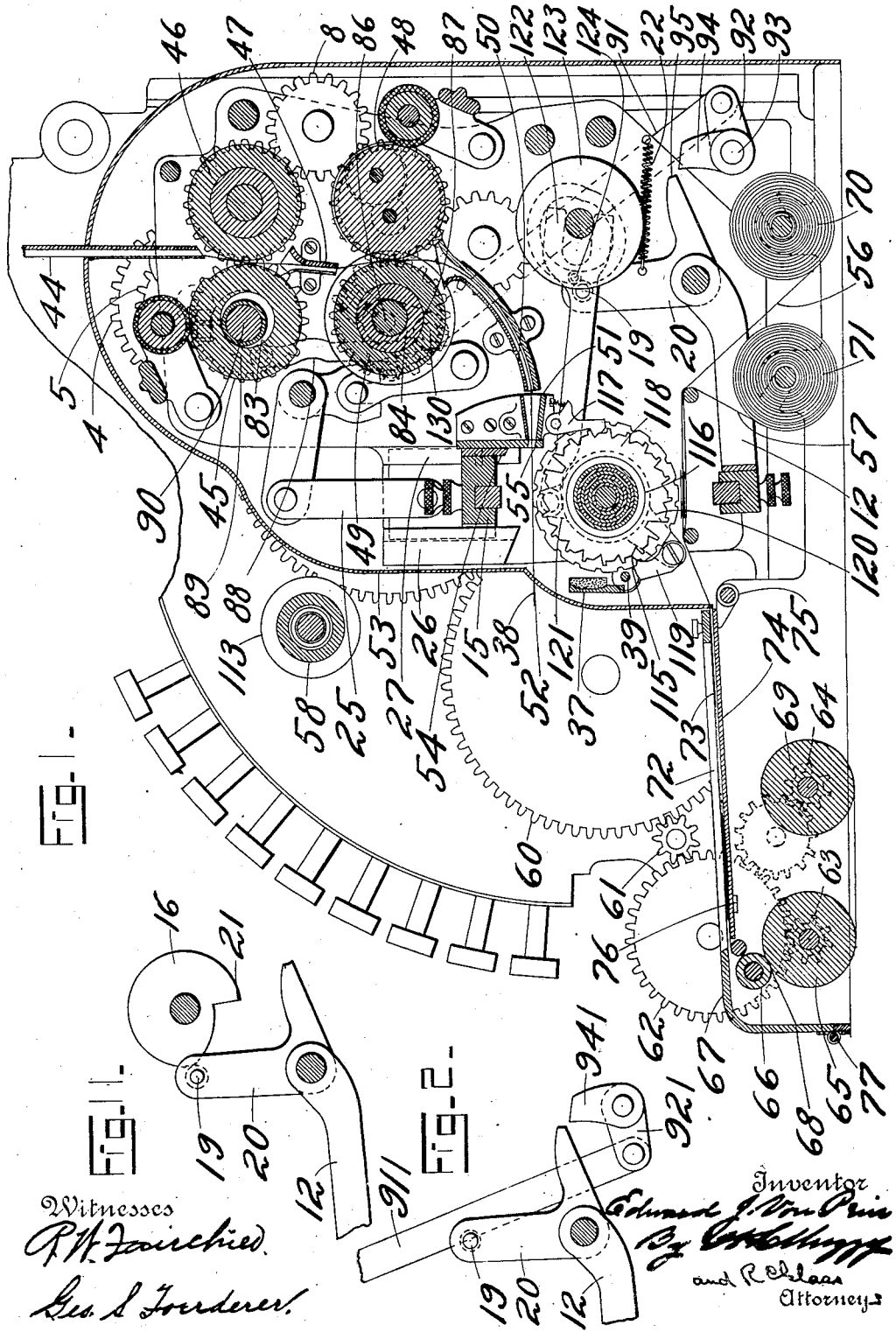

E. J. VON PEIN.
CASH AND AUTOGRAPHIC REGISTER.
APPLICATION FILED MAR. 9, 1910.
1,131,753.
Patented Mar. 16, 1915.
6 SHEETS—SHEET 2.
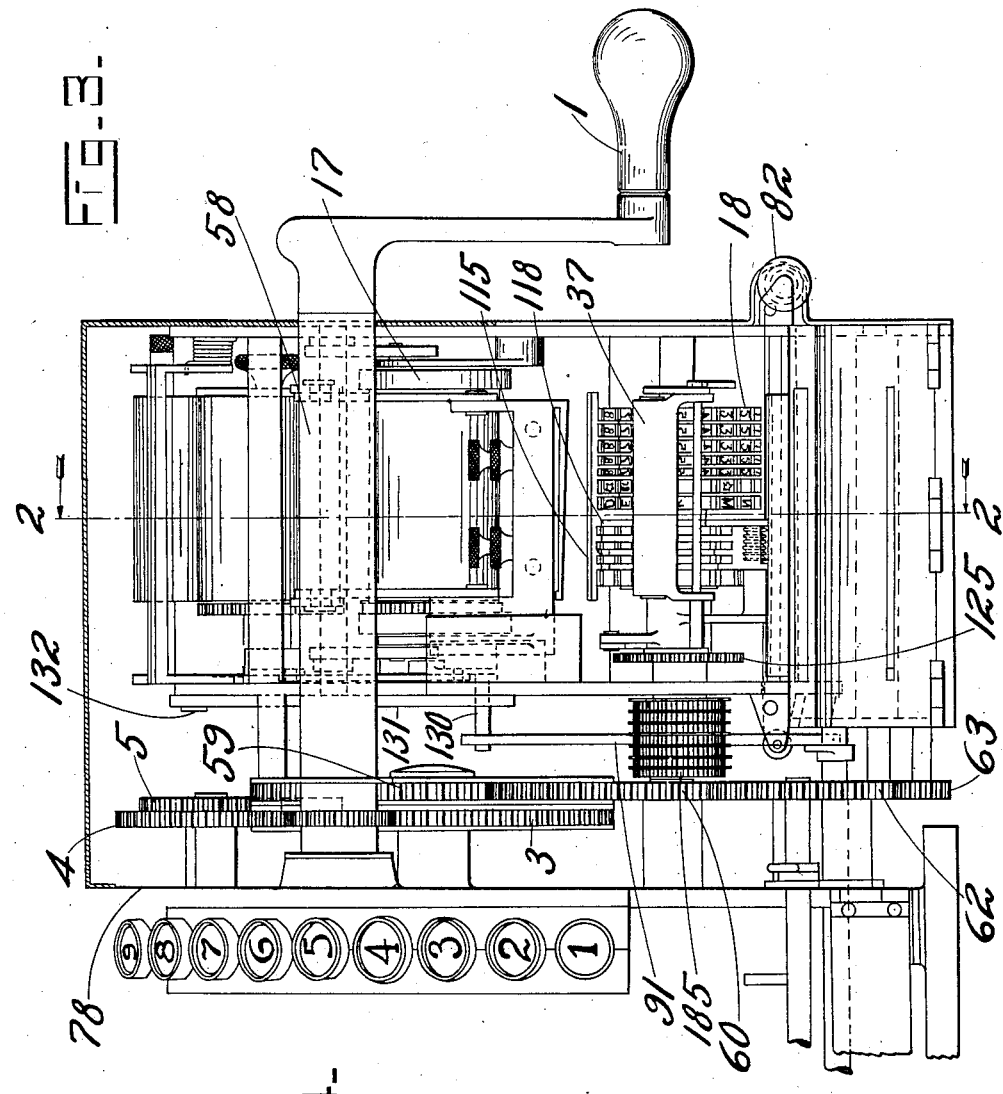
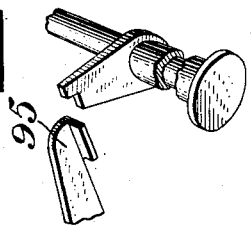

E. J. VON PEIN.
CASH AND AUTOGRAPHIC REGISTER.
APPLICATION FILED MAR. 9, 1910.
1,131,753.
Patented Mar. 16, 1915.
6 SHEETS—SHEET 3.
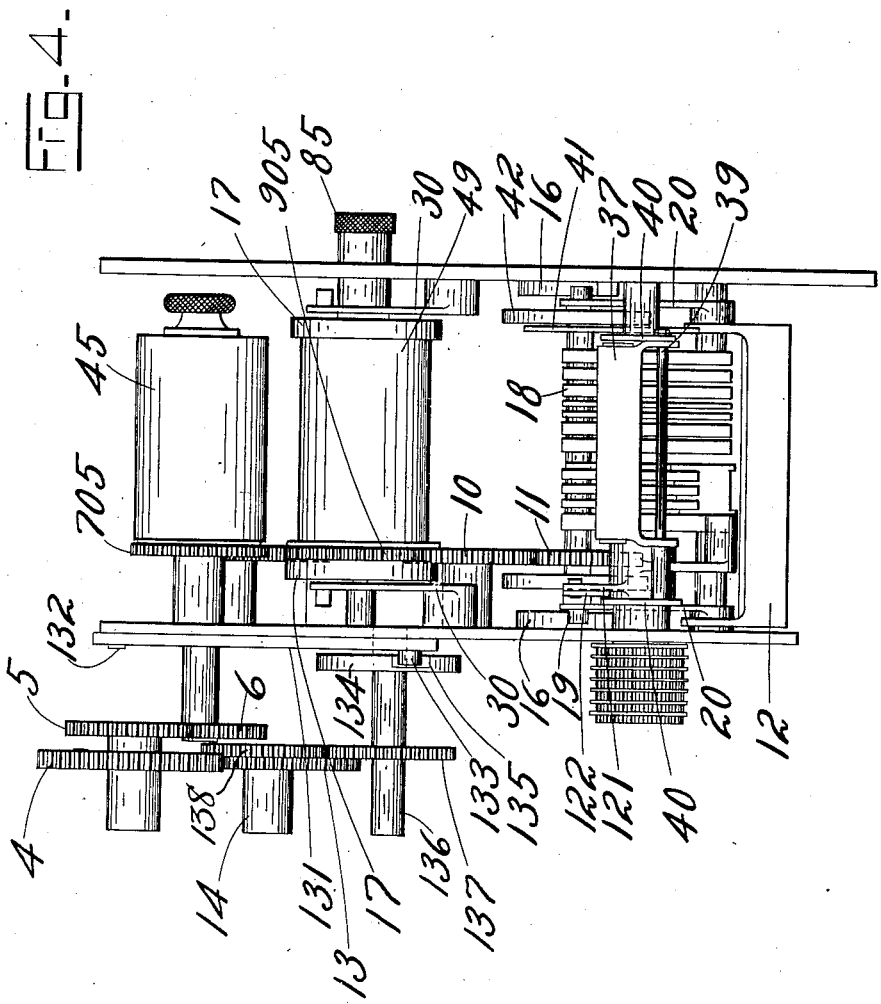

E. J. VON PEIN.
CASH AND AUTOGRAPHIC REGISTER.
APPLICATION FILED MAR. 9, 1910.
1,131,753.
Patented Mar. 16, 1915.
6 SHEETS—SHEET 4.
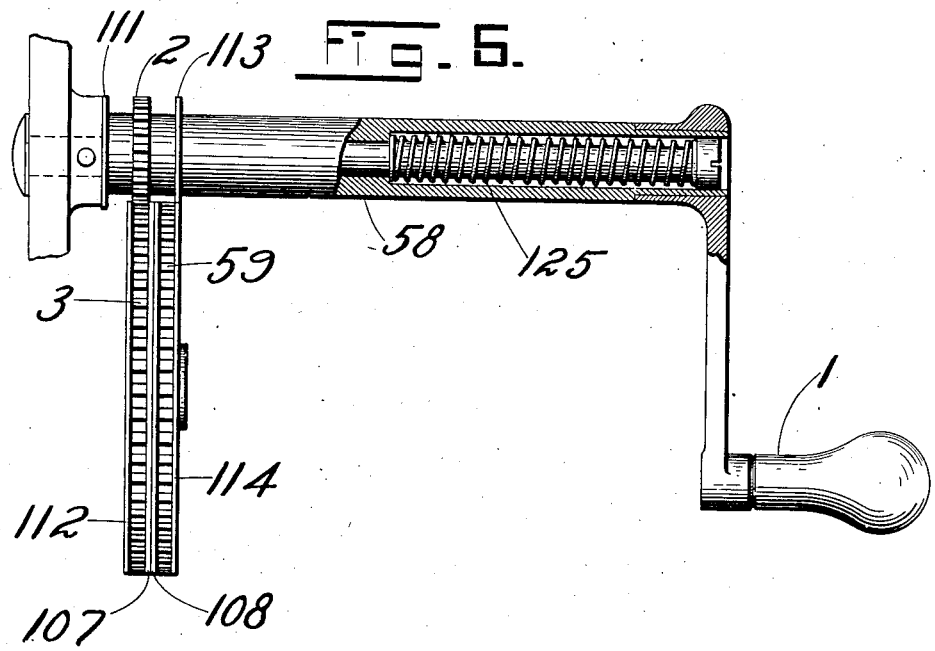
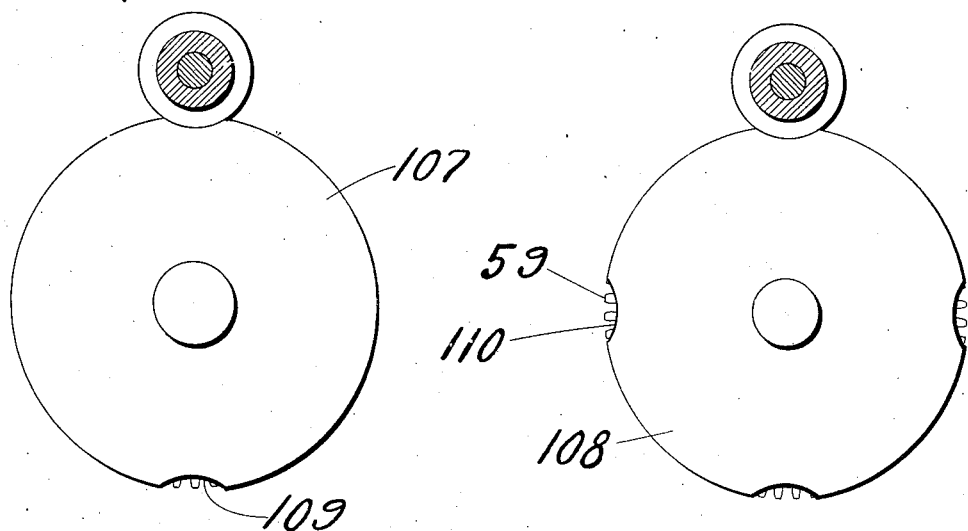
Witnesses
G. W. Fairchild
Geo. S. Fourderer
Inventor
Edward J. Von Pein
By J. W. Klipp
and R. C. Glass
Attorneys

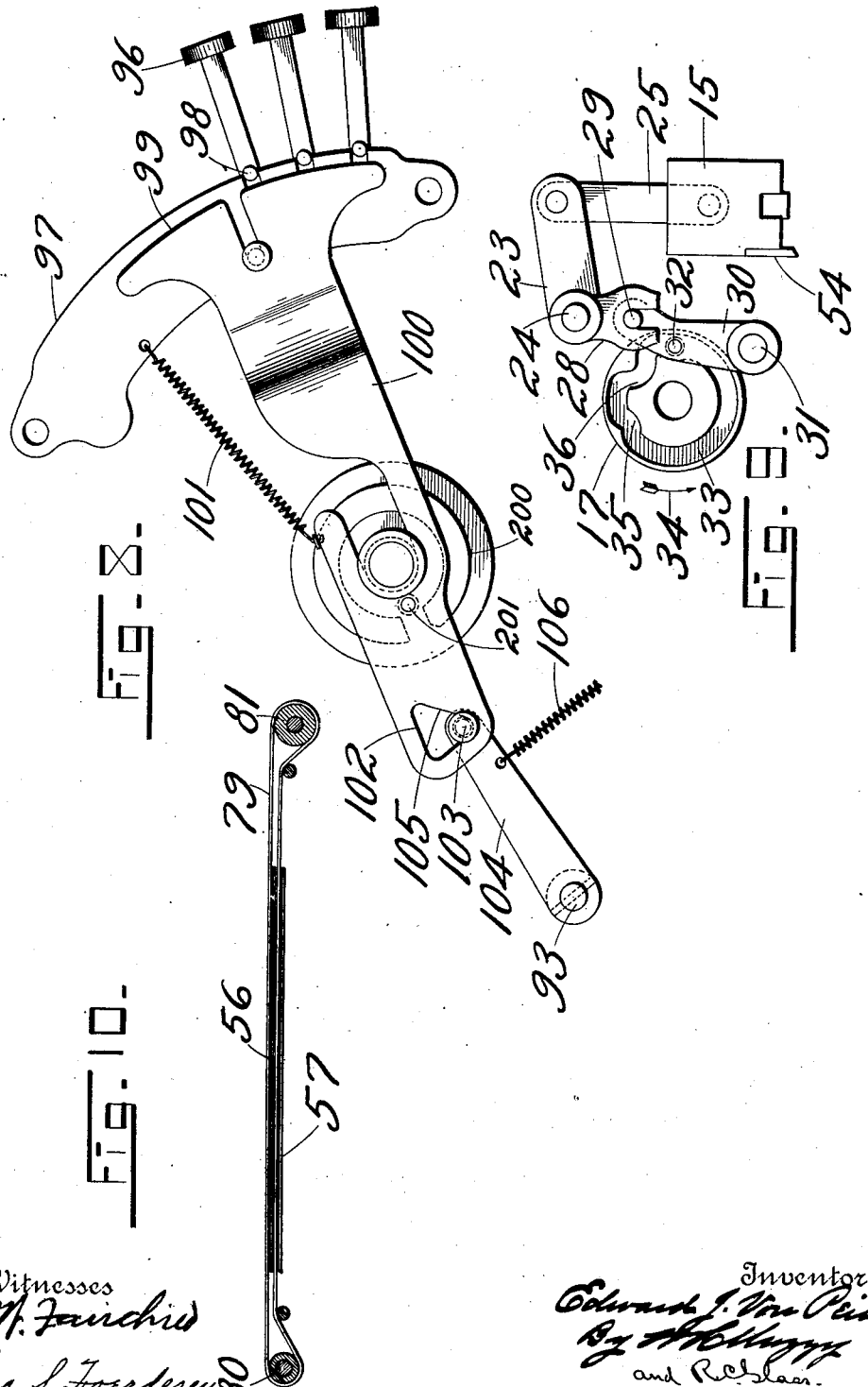

E. J. VON PEIN.
CASH AND AUTOGRAPHIC REGISTER.
APPLICATION FILED MAR. 9, 1910.

1,131,753.

Patented Mar. 16, 1915.
6 SHEETS—SHEET 6.

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND AUTOGRAPHIC REGISTER.

1,131,753.  Specification of Letters Patent.  Patented Mar. 16, 1915.

Application filed March 9, 1910. Serial No. 548,173.

*To all whom it may concern:*

Be it known that I, EDWARD J. VON PEIN, a citizen of the United States, residing at Dayton, in the county of Montgomery and State of Ohio, have invented certain new and useful Improvements in Cash and Autographic Registers, of which I declare the following to be a full, clear, and exact description.

This invention relates to cash registers and among the objects of the invention is to provide an improved autographic attachment to cash registers and the register controlling means for printing upon strips of autographic paper the amounts of items which are recorded in the register.

Another object of the invention is to provide separate connections from the driving mechanism of the cash register for feeding the autographic paper.

Another object of the invention is to provide a combined cash register and autographic device with a single means for operating the driving mechanisms of the two devices which means may be adjusted to cause the operation of either the cash register or the autographic device at will.

Another object of the invention is to provide a cash register with means for printing records upon strips of autographic paper combined with means for printing upon a strip of check paper.

Another object of the invention is to provide a cash register with combined means for printing upon a strip of autographic paper and a strip of check paper with a manipulative device for making the printing mechanism inoperative and with means depending upon the manner of operating the machine for restoring the printer to its operative condition.

With these and incidental objects in view the invention consists in certain novel features of construction and combinations of parts the essential elements of which are set forth in appended claims and a preferred form of embodiment of which is hereinafter described with reference to the drawings which accompany and form part of the specification.

Figure 13:
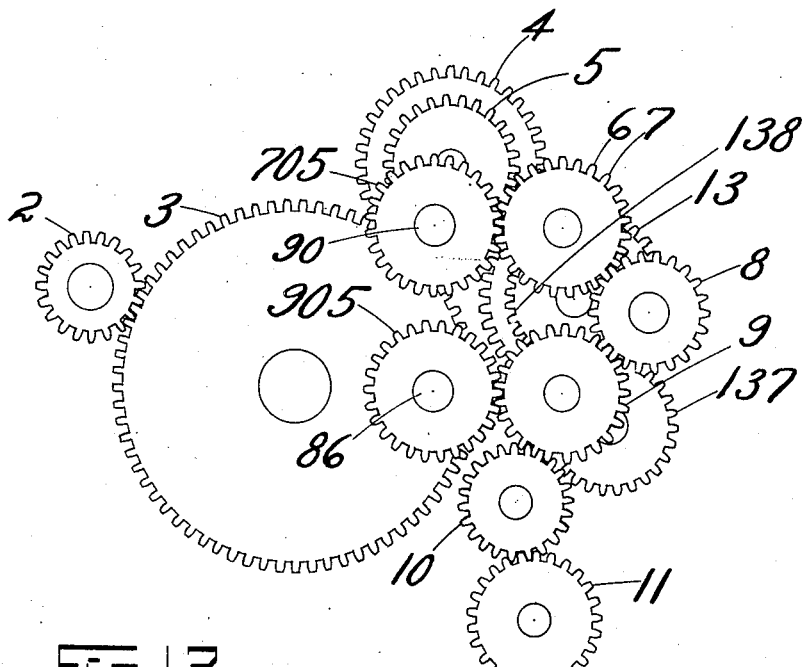

Of said figures: Figure 1 is a transverse vertical section taken on the line 2—2 of Fig. 3 of the autographic attachment and check printing mechanism. Fig. 2 is a modification of the autographic platen throwout mechanism. Fig. 3 is a front elevation of the autographic attachment and check printing mechanism with the casing in section. Fig. 4 is another front elevation of the autographic attachment and check printing mechanism but with certain parts omitted in order to illustrate the train of gears which operates the check printer. Fig. 5 is a detail of the crank handle and connecting gears by which the cash register and the autographic attachment are driven. Fig. 6 is a detail of a driving gear and a guard carried thereby, which operates a train of gears for operating the cash register. Fig. 7 is a detail of the driving gear for the train of gears operating the autographic attachment and a guard carried by the gear. Fig. 8 is a detail of a bank of special keys illustrating its control of a throwout device for printing mechanism. Fig. 9 is a detail of the operating mechanism of the platen which effects impressions upon the strip of check paper. Fig. 10 is a detail illustrating how the ink ribbon of the autographic attachment is mounted. Fig. 11 (Sheet #1) is a detail of the platen arm of the autographic mechanism and the cam which operates the arm. Fig. 12 is a detail of the "on and off" knob by means of which the printing mechanism may be made either operative or inoperative. Fig. 13 is a detail of the train of gears which transmit power to the printing mechanism. Fig. 14 (Sheet #2) is a detail of means for preventing the operation of the platen of the autographic device upon any or all operations of the machine.

The cash register to which the present improvements are shown as applied is a well known machine which is fully described in the patent to Cleal and Reinhard 580,378, April 13, 1897, and Carroll, 703,639, July 1, 1902.

The improvements herein disclosed mainly relate to the printing mechanism and the autographic attachment together with the driving mechanism for these two devices. The registering mechanism serves to set the type carriers of the printing mechanism and the printing mechanism may be made operative or inoperative by a manipulative device but when special transactions are recorded means are provided whereby the printing mechanism and autographic device will become operative, if not in their operative condition before the special transaction is recorded.

The cash register comprises a plurality of banks of value keys, each bank controlling a denominational element of differential mechanism which is in turn geared to a pinion having secured thereto a type-carrier of a denominational order corresponding to the denominational order of its controlling element in the differential mechanism. Therefore the setting of the type-carriers corresponds to the operation of the differential mechanism which is controlled by the keyboard of the cash register. The type-carriers are provided with two like sets of type, one set for printing upon a check strip and the other set for printing upon strips of autographic paper. A consecutive numbering device is journaled at the side of the type-wheels and also bears two sets of type for printing on the check strip and the autographic strips so that the consecutive number of each record will be printed at the side of the record. The platens for taking impressions from the type-wheels are operated during the operation of the cash register and just before the cash register comes to rest. The feeding mechanism of the autographic device may then be operated to feed a slip of autographic paper out of the autographic device and also roll up a duplicate of such slip within the autographic device. The platen for causing impressions to be made upon the autographic strips is so arranged that it may be prevented from operating regardless of what kind of transaction is recorded in the register, while the check printing mechanism may be made inoperative only upon the recording of cash sales.

To operate the machine, the desired amount keys are depressed and then power is applied to the driving mechanism by means of a crank handle 1 (Fig. 5) which is rotated twice thereby causing a pinion 2 to make two rotations and as it is normally geared to a gear 3, of four times its diameter, the gear 3 will make one-half of a rotation. The gear 3 through a train (Figs. 4 and 13) of gears 4, 5, 6, 7, 705, 8, 9, 905, 10 and 11 causes the desired rotation of the operating elements of the check printing device and operation of a platen 12 of the autographic device. The gear 4 also meshes with a gear 13 which is secured to the main drive shaft 14 of the cash register.

The platen 12 of the autographic device and a platen 15 for the check printing mechanism are operated by cams 16 (Fig. 11) and 17 (Fig. 9) respectively, but these cams do not operate the platens until amount type-wheels 18 have been properly set by the register. The cams 16 actuate the platen 12 by co-acting with rollers 19 which are carried by arms 20 rigid with the platen 12 and when the shoulders 21 of the cams 16 clear the rollers 19, the platen will be drawn by a spring 22 into engagement with the type-wheels 18. The platen 15 is suspended from arms 23 which are pivoted on a shaft 24 by the links 25 and is guided to move in a vertical direction by guides 26 and 27. The shaft 24 upon which the arms 23 are mounted also carries arms 28 which are forked over pins 29 carried by arms 30 pivoted on a pin 31 and carrying rollers 32 which extend into grooves 33 of the cams 17. The cams 17 rotate in the direction indicated by the arrow 34 and the grooves 33 in the cams are non-circular at two points 35 and 36. When the parts 35 of the grooves act upon the rollers 32 the arms 30 are caused to rock far enough so that the platen 15 will engage an ink pad holder 37 pressing the same against the type and thereby inking the type. The platen is then returned to its normal position and when the parts 36 of the grooves in the cams 17 engage the roller 32, the platen will be lowered again and far enough to cause an impression to be made upon a strip of check paper 38.

The ink pad carrier 37 is pivoted on pin 39 to an arm 40 which is pivoted concentrically with the type-wheels 18 and is rocked to carry the ink pad holder 37 beneath the platen 15 by a pitman 41 before the first lowering of the platen 15. The pitman 41 is operated by a cam 42 which co-acts with a roller on the pitman for the purpose of oscillating it.

The check paper 38 is led from a supply roll (not shown in the drawings) through a guide 44; between an electro-roll 45 and an impression roll 46; through a guide 47; between an electro-roll 48 and an impression roll 49; from thereout through guides 50 and 51; between the type-wheels 18 and the platen 15, and finally out through an opening 52 in a casing 53. When the platen 15 is lowered to take an impression the printed portion of the check strip 38 is severed by a knife 54 which is secured to the platen 15 and co-acts with a fixed knife edge 55. The electro-rolls 45 and 48 are on opposite sides of the check strip 38 so that one of the rolls will print upon the face of the check strip and the other will print upon the back of the check strip. These rolls are located at such a distance from the type-wheels 18 that during an operation of the machine the electro-roll 48 will print upon the check which will be issued upon the next succeeding operation of the machine and the electro-roll 45 will print upon the check which will be issued upon the second succeeding operation of the machine. The rolls merely print dates and if desired, advertising matter. It is therefore not necessary that the electro-rolls print upon the check which is to be issued on a coincident operation as is the case with the amount type-wheels 18.

The platen 12 which causes impressions to be made upon strips of autographic paper 56 and 57 operates after the amount type-wheels 18 have been properly set and before the crank handle 1 comes to rest. After the crank handle comes to rest it is drawn outwardly to carry the pinion 2 (Figs. 3 and 5) which is rigidly secured to a sleeve 58 upon which the crank handle is mounted into engagement with a gear 59. The crank handle 1 is then given one rotation thereby causing the gear 59 to make one quarter of a rotation and the gear 59 meshes with a gear 60 (Fig. 1) which in turn meshes with a pinion 61 meshing with the gear 62 which meshes with a pinion 63 and through an intermediate gear drives a pinion 64. The pinion 63 is secured to a feed roll 65 which through friction engagement with a roll 66 feeds the autographic strips 56 and 57. The strip 56 is led out of casing 67 of the autographic device at 68 and the strip 57 is led from the rolls 66 and 65 to a receiving roll 69 to which the pinion 64 is secured. Rolls 70 and 71 are the supply rolls of the strips of paper 56 and 57 respectively. If it is desired to make autographic notations of a sale which is to be recorded in the register these notations will be made upon the strips 56 and 57 at the writing space 72 before the second operation of the crank. The writing platform 74 has hinges 75 and rests upon lugs 76. In order to remove the autographic strips, the casing 67 has hinges 77, and by rocking the casing, and then rocking the table 74 around its hinges 75, the storage roll may be removed. Access to the supply rolls 70 and 71 is had by removing the usual hood 53 which surrounds the printing mechanism. This hood is held in place by lugs and a lock co-acting with shoulders on the frame 78, but these are not shown in the drawings.

The ink for the impressions on the strips 56 and 57 from the type-wheels 18 is furnished by an ink ribbon 79 (see Fig. 10) which is an endless ribbon supported by rolls 80 and 81 and passing over the strip 56 and over the strip 57. The roll 81 is furnished with a knurled head 82 (Fig. 3), by which it may be manually rotated to feed the ink ribbon.

The rolls 45 and 49 are journaled upon eccentric disks 83 and 84 which may be slightly rocked to carry the rolls 45 and 49 away from the rolls 46 and 48 thereby preventing the feed of the check paper and also impressions thereon both from the rolls 45 and 48 and from the type-wheels 18 as when the rolls do not feed the strip of check paper the strip will not be moved between the platen 15 and the type-wheel 18. The eccentric disks 83 and 84 may be rocked to cause the printer to become inoperative by a knurled head 85 which is mounted upon the shaft 86 carrying the disk 84 as illustrated in Fig. 12. The shaft 86 carries an arm 87 to which is pivoted a link 88 connecting the arm 87 with an arm 89 secured to a shaft 90 which carries the eccentric disk 83. Therefore when the shaft 86 is rocked, the shaft 90 will also rock, thereby causing the rolls 45 and 49 simultaneously to rock away from or toward their companion rolls. A link 91 connects the arm 87 with an arm 92 which is secured to a shaft 93. This shaft carries an arm 94 (Figs. 1 and 2) which when the eccentric disks 83 and 84 are rocked to carry the rolls 45 and 49 away from their companion rolls, will because of the link connection 91 rock into the path of a rearwardly extending arm 95 of the arm 20 which rocks with the platen arm 12. It is therefore impossible for the platen 12 to operate when the check printing mechanism is made inoperative.

The slot and pin connection between the knurled head 85 (Fig. 12) and the shaft 86 permits the shaft 86 to oscillate to cause the check printing mechanism and platen 12 to become operative independently of returning the knurled head 85 to its original position and the shaft 86 may be so rocked by depressing one of the special keys 96 (Fig. 8). The machine is arranged to compel the issuing of a check regardless of the setting of the knurled head 85 whenever one of the special keys is depressed, as one of these keys is depressed whenever a "Received on account", a "Charge" or a "Paid out" transaction is recorded and the check in such cases serves as memorandum of the transaction. It is also at times particularly desirable when such records are made to issue an autographic sales slip. For this reason, the autographic mechanism is arranged to become operative whenever the check printing mechanism is operative. To this end the special keys 96 are depressible against the action of springs and are guided by a slotted plate 97, the slots of which co-act with pins 98 on the special keys. These pins extend beyond the plate 97 across the edge 99 of a slide 100 which when a special key is depressed moves rearward in a lineal direction against the action of a spring 101. At its rear end the slide 100 is provided with an angular opening 102 through which extends a pin 103 carried by an arm 104 secured to the shaft 93. When the slide 100 is moved rearward, the edge 105 of the opening 102 engages the pin 103 and thereby rocks the arm 104, that is, provided the arm 104 is not in its upper position at the time the special key is depressed. The arm 104 is in its upper position when the printing mechanism is in operative condition as will be understood from Fig. 1, considered with Fig. 8. When the arm 104 is rocked upwardly upon the depression of a special key it rocks the shaft 93 thereby causing the arm 94 (Fig. 1) to move away from the extension 95 of the arm 20 and also through the arm 92, link 91, and arm 87 causes the eccentric disks 84 and 83 to rock their respective rolls into contact with their companion rolls thereby making the printing mechanism operative. The special keys are retained in their depressed position, while the machine is operating by any usual key detent. After the release of the depressed special key and when the machine comes to rest in its home position, the slide 100 is returned to its initial position by the spring 101 and the spring 106 returns the arm 104 and the mechanism which the arm 104 controls, including the eccentric disks, to their original positions. During the rotation of drive shafts of the machine slide 100 is retained either in its outer or inner position by a circular flange 200 co-acting with a roller 201 of the slide.

The knurled head 85 (Fig. 12) engages shaft 86 by a pin 126 extending into a groove 127 in the shaft and is retained in its set position by a fixed pin 128 which co-acts with holes 129 in the head 85. The shaft 86 is partly cut away at one side of groove 127 thus permitting the shaft to rock in one direction independently of the knurled head. This arrangement is provided so that when the eccentric disks are set to inoperative positions and a special transaction key is depressed, rocking of shaft 86 will not be prevented.

The pin 130 (Figs. 1 and 3) which connects the link 91 with the arm 87 on the shaft 86 extends through an arm 131, (Figs. 3 and 4), which is pivoted by a pin 132 to the frame of the printing mechanism. This arrangement causes the arm 131 to be rocked with the shafts 86 and 90. The arm carries a roll 133 which when the arm is rocked is carried either into or out of a circular race in a disk 134 through an opening 135 therein. The shaft 136 to which the disk 134 is secured carries a gear 137 which meshes with a gear 138 rigid upon the shaft 14. Therefore upon the rotation of the shaft 14 the disk 134 will be rotated and through the arm 131 will positively hold the check printing mechanism either in its operative or inoperative position depending upon whether the roll 133 is outside of the disk 134 or in the race thereof.

Fig. 2 illustrates a modification of the mechanism for making the platen 12 inoperative which operates reversely to that which is shown in Fig. 1. If the machine is constructed with this modification it will result in the platen 12 becoming inoperative when the check printing mechanism is made operative and vice versa. The object of this modification is merely to provide means if desired by which the machine may upon every operation either issue a check or a printed sales strip. It will be readily seen that with the construction of Fig. 2, when the check feeding rolls are ineffective the arm 941 will release the platen arm 20 through its connection, consisting of arm 921 and link 911, to arm 87. Arm 87 is fast to the eccentric shaft 86 as previously described.

The gears 3 and 59 are provided with guards 107 and 108 respectively (Figs. 5, 6 and 7). The gear 3 makes one-half of a rotation upon each operation of the machine. At the completion of the operation, the operator may wish to operate the autographic mechanism. He will then pull the handle 1 outwardly drawing the pinion 2 through one of the cut away parts 109 in the guard 107 and through one of the cut away parts 110 in the guard 108 into mesh with the gear 59 by means of which the autographic mechanism is operated. When the handle 1 is drawn outwardly, a disk 111 which is carried by the sleeve 58 to which the handle 1 is secured enters one of the cut away parts 109 of a disk 112 which is similar to the disk 107 and also rigidly secured to the gear 3. It is therefore impossible to rotate the gear 3 when the pinion 2 meshes with the gear 59. Also when the handle 1 is in its inner position, the disk 113 enters one of the cut away parts 110 of a disk 114 which is a duplicate of the disk 108 and is rigidly secured to the gear 59. Thus the gear 59 is prevented from rotating while the cash register is being operated. The disks 107 and 112 are provided with two cut away parts at opposite sides of the disks because these disks only make one-half of a rotation upon each operation of the register. The disks 108 and 114 are provided with four cut away parts 110 equally spaced from each other as these disks only make one-quarter of a revolution upon each operation of the autographic mechanism.

When the autographic feed takes place the handle 1 is stopped in its home position and pinion 2 again meshed with gear 3. The sleeve 58 which carries pinion 2 and disks 111 and 113 is urged to its inner position by a spring 125 (Fig. 5). Accordingly when pinion 2 is in mesh with gear 59 the spring 125 serves to carry pinion 2 out of mesh with gear 59 and into mesh with gear 3 upon the completion of a rotation of pinion 2, at which time one of the cut away parts of disk 114 registers with disk 113.

At the left side of the type-wheels 18 are four type-wheels 115 (Fig. 3) which are similar to the amount type-wheels 18 but are used for printing a consecutive number upon the check and autographic strips. Impressions are taken from these type-wheels by the same platens 12 and 15. The type-wheels 115 are loosely journaled upon a sleeve 116 and are normally prevented from rotating by retaining pawls 117 which are spring pressed into engagement with notched disks 118 rigid with the type-wheels 115. The consecutive numbering device is operated by a multipronged pawl 119 which is carried by an arm 120 journaled upon the sleeve 116 and provided with an ear 121 whereby it is pivoted to one end of a pitman 122. The pitman 122 is reciprocated to rock the multipronged pawl one tooth space upon each operation of the machine by a box cam 123 acting upon a roller 124 carried by the pitman.

Fig. 14 shows a hand operated device which may be employed to prevent the platen 12 from striking, if it is desired not to print on the autographic strip. Its operation is obvious.

*Operation:* When a cash sale is recorded and it is desired to issue both a check and autographic sales slip, the machine is operated as follows: The amount keys representing the amount of sale are depressed and then the handle is twice rotated causing the register to be operated as controlled by the depressed amount keys and thereby through the pinions 185 set up the type wheels 18. At the same time the check strip 44 is fed forwardly by two pairs of rolls 45 and 46 and 49 and 48, these rolls at this time printing the date and any other desired matter upon the front and the back of the check strip. The platens 12 and 15 are then operated, the platen 15 effecting the impression from the amount type wheels and the consecutive numbering device upon the check strip 44, and also, as it carries the knife 54, cutting the printed part of the check from the remainder of the strip. The platen 12 serves to cause the same record to be printed upon the strips of autographic paper 56 and 57. The handle 1 is then drawn outwardly and caused to make one rotation. Written notations are made upon the autographic strips at the writing space 72 before the handle 1 is drawn outwardly and rotated. Upon this second operation of the handle 1, the printed part of the strip 56 is fed out of the autographic device at 68 and the duplicate is rolled up on the roll 69. The feed rolls 65 and 66 are caused to rotate at this time by the train of gears 59, 60, 61, 62 and 63 which serve to transmit the rotation of the pinion 2 to the feed rolls 65 and 66.

If when a cash registration is made it is not desired to record the sale upon the check strip 44 and the autographic strips 56 and 57, the knob 85 (Fig. 4) is rocked to the right, thereby causing the eccentric disks 83 and 84 to carry their respective rolls 45 and 49 out of contact with the companion rolls and thereby prevent the feed of the check strip. The same movement of the eccentric disks draws link 91 upwardly and through it moves the stop 94 into the path of the extension 95 of the platen arm 12 and thereby prevents operation of the platen of the autographic device. In operating the register in this way after twice rotating the handle 1, the handle 1 will not be drawn outwardly as is the case when the autographic device is operated. If the printing mechanism is in its inoperative condition and a special transaction is recorded the depression of one of the special keys 96 will cause the printing mechanism to become operative and thereby issue a check and also print the record upon the autographic strips. The depression of one of the special keys by pushing the slide 100 rearwardly causes the shaft 93 to rock back to its normal position and through the link connection 91 with the disks 83 and 84 causes them to rock their respective rollers 45 and 49 into contact with the companion rollers. Then when handle 1 is rotated the check strip 44 will be fed forwardly and printed and the autographic strips will also be printed. Upon the release of the depressed special key, the shaft 93 will rock to the position where it prevents operation of the printing mechanism under the action of the spring 106.

While the form of mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination with printing mechanism comprising a plurality of type-carriers each provided with two sets of type, means for simultaneously taking impressions from the two sets of type-carriers, driving mechanism, a paper feeding device operated by the driving mechanism, a second paper feeding device, driving mechanism for operating the said second paper feeding device, and means for actuating both driving mechanisms, constructed to actuate one only of said driving mechanisms at a time and to lock the remaining driving mechanism against operation.

2. In a machine of the class described, the combination with type-carriers, and means for feeding a check strip and an autographic strip past the same, of a main driving mechanism for both said feeding means normally connected to one thereof, and manually movable to disable said connection and to establish a connection with the other feeding means.

3. In a machine of the class described, the combination with an autographic device, and a printing mechanism, of co-axially journaled gears connected respectively to actuate said autographic device and said printing mechanism, a pinion, means for moving the pinion in an axial direction to mesh it with either of the said gears, means for rotating the pinion, and members rotatable with said gears and said pinion, and constructed to co-act to prevent axial movement of the pinion except when both of said gears are in their normal position.

4. In a machine of the class described, the combination with type-carriers, and a separate and independent means for feeding a check strip and an autographic strip past said carriers, each feeding means including a gear, and a main driving mechanism, including a pinion mounted to be manually shifted to place said pinion in mesh with said feeding gears separately.

5. In a machine of the class described, the combination with type-carriers, and separate and independent means for feeding a check strip and an autographic strip past said carriers, each feeding means including a gear, a main driving mechanism including a pinion mounted to be manually shifted to place said pinion in mesh with said feeding gears separately, and a notched disk movable with said pinion and serving to obstruct said manual shifting thereof.

6. In a machine of the class described, the combination with type-carriers, and separate and independent means for feeding a check strip and an autographic strip past said carriers, including coaxially journaled gears, of a main driving mechanism for both said feeding means, including a pinion mounted to be manually shifted to place said pinion in mesh with said gears separately, and means movable with said pinion and serving to obstruct said manual shifting thereof.

7. In a machine of the class described, the combination with separate and independent means for feeding a check strip and an autographic strip, each including a gear, of a main driving mechanism, including a pinion mounted to be shifted manually to place said pinion in mesh with said feeding gears separately, and means movable with said pinion serving to obstruct said manual shifting thereof.

8. In a machine of the class described, the combination with type-carriers, and separate and independent means for feeding a check strip and an autographic strip past said carriers, a main driving mechanism, including a pinion manually shiftable to place said pinion in operative relation with said feeding means separately, a platen for taking impressions from said type-carriers on the autographic strip, means for disabling said check feeding means, and connections from said disabling means controlling the operation of said autographic platen.

9. In a machine of the class described, the combination with mechanism for feeding and printing a strip of record material, and a gear train for driving said mechanism, mechanism for feeding an autographic strip, and an additional gear train for driving said latter feeding mechanism, of a main actuating device comprising a driving pinion adjustable to connect with either of said gear trains as desired.

10. In a machine of the class described, the combination with mechanism for feeding and printing a strip of record material, and driving devices for said mechanism, mechanism for feeding an autographic strip, and driving devices for said latter feeding mechanism, of a main actuating device manually adjustable to engage with and operate either of said driving devices at will.

11. In a machine of the class described, the combination with mechanism for feeding and printing a strip of record material, and driving devices for said mechanism, mechanism for feeding an autographic strip, and driving devices for said mechanism, of a main operating device comprising a handle and an actuating pinion rotated by said handle, said pinion being adjustable to engage with and operate either of said driving devices at will.

12. In a machine of the class described, the combination with mechanism for feeding and printing a strip of record material, and a gear train for driving said mechanism, mechanism for feeding an autographic strip, and an additional gear train for driving said latter feeding mechanism, of a main actuating device comprising a handle and a pinion rotated thereby, said pinion being mounted to slide axially and be thereby engaged with either of said gear trains as desired.

13. In a machine of the class described, the combination with mechanism for feeding and printing a strip of record material, and devices including a gear for actuating said mechanism, mechanism for feeding an autographic strip, and additional devices, including a second gear adjacent said first gear, for actuating said latter feeding mechanism; of a main operating device comprising a handle and a pinion rotated by said handle, said pinion being positioned normally to engage said first gear, but manually shiftable to engage said second gear.

14. In a cash register, the combination with a plurality of feeding devices for record material, of independent operating mechanisms for said devices, a driving mechanism common to said operating mechanisms, and means for operatively connecting said driving mechanism with only one at a time of said operating mechanisms.

15. In a machine of the class described, the combination of an entry receiving device, operating means therefor, a second entry receiving device adapted to receive an entry other than that entered in the first mentioned device, mechanism operated during the operation of said operating means for entering on the second device the entry entered on the first mentioned device, operating means for the second entry receiving device, a common driving means adapted to selectively drive the operating mechanisms for both entry receiving devices, and means whereby the mechanism for entering the entry entered upon the first mentioned device upon the second device can be disabled when the common driving mechanism is driving the operating mechanism for the first entry receiving device.

In testimony whereof I affix my signature in the presence of two witnesses.

EDWARD J. VON PEIN.

Witnesses:
  Roy C. Glass,
  Carl W. Beust.